Feb. 22, 1927. 1,618,687
C. G. SWANSTROM
VALVE MECHANISM
Filed Sept. 25, 1925    3 Sheets-Sheet 1
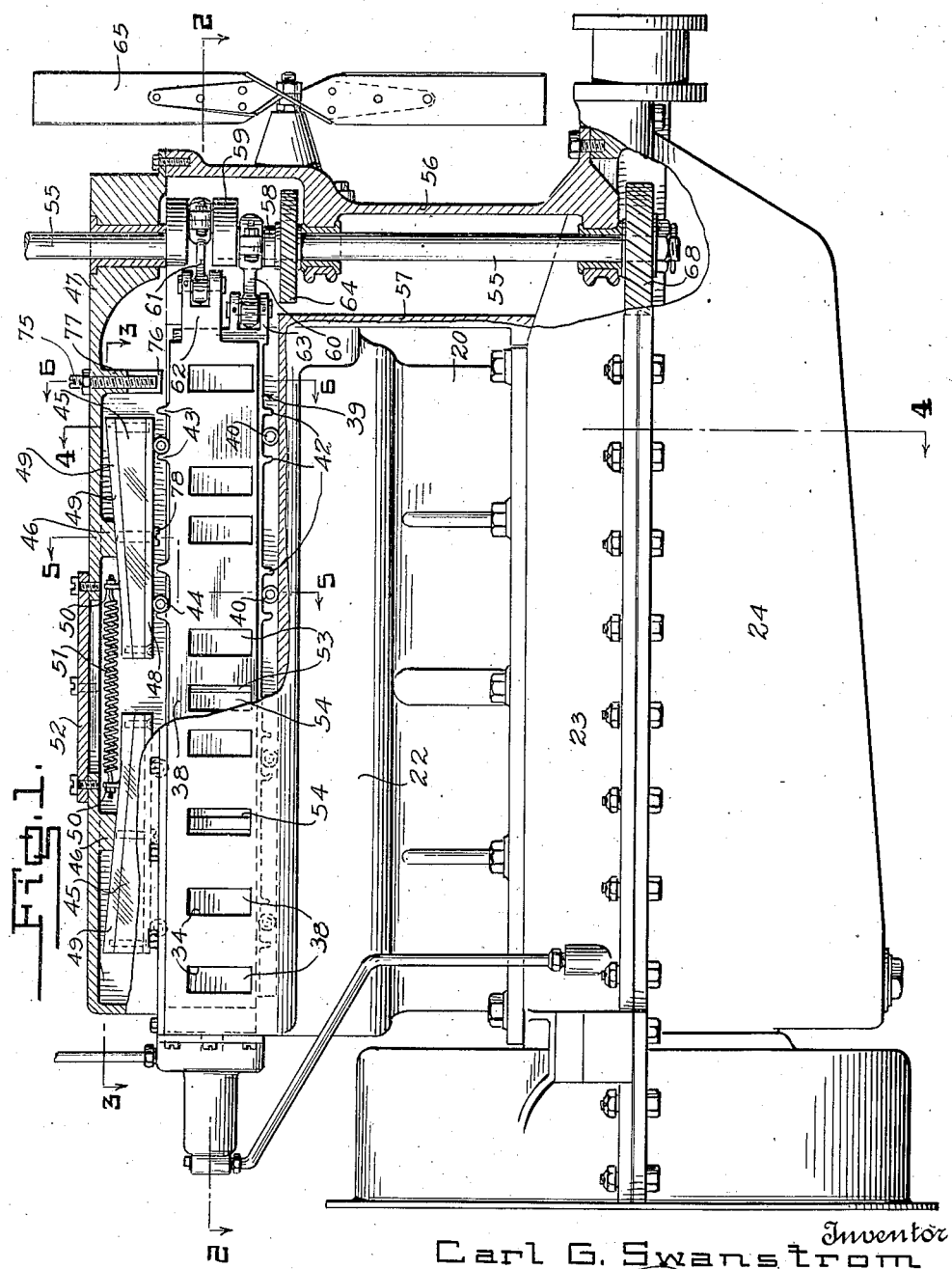
Inventor
Carl G. Swanstrom
Attorneys Feb. 22, 1927.  
C. G. SWANSTROM  
VALVE MECHANISM  
Filed Sept. 25, 1925  
1,618,687  
3 Sheets-Sheet 2
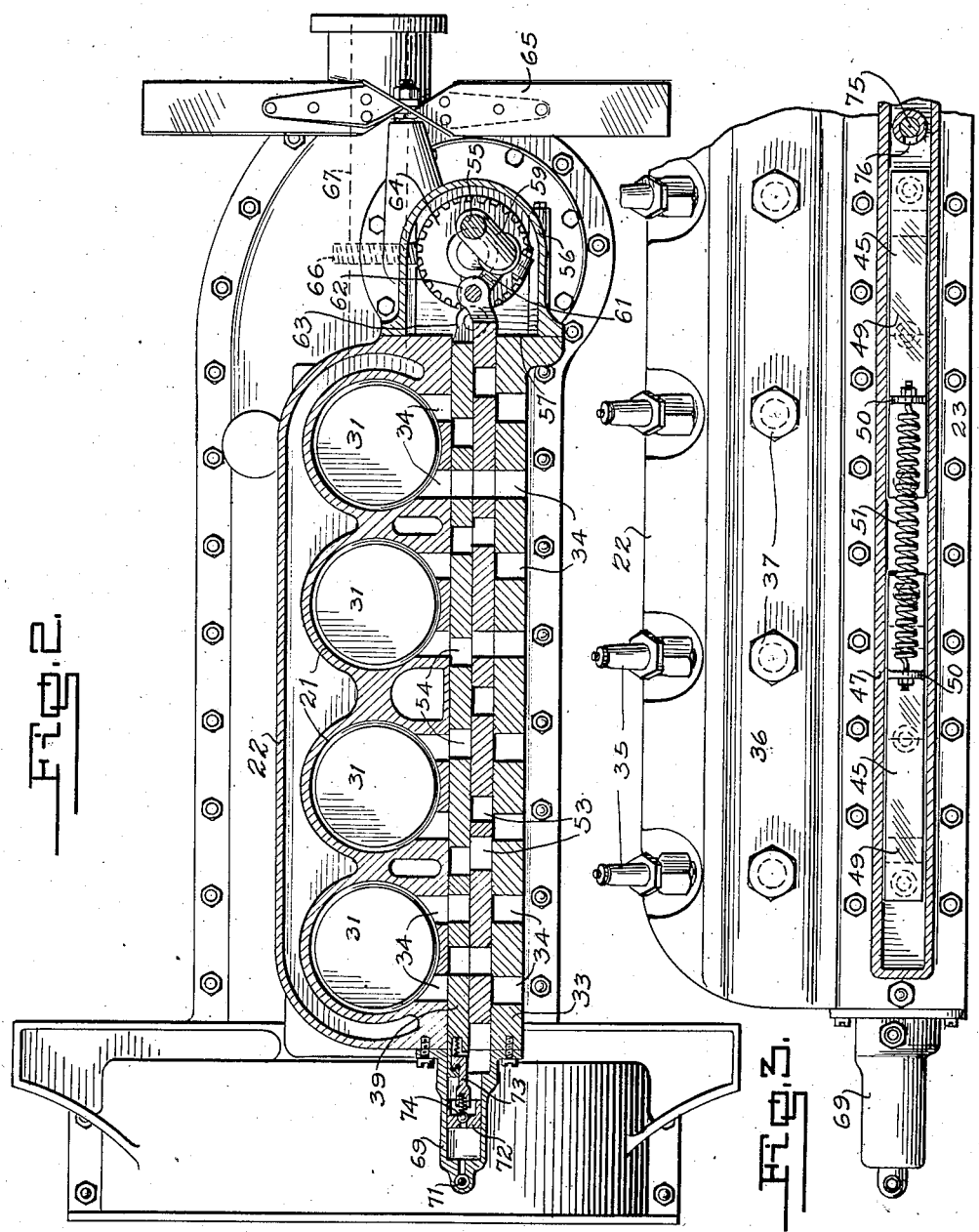
Inventor  
Carl G. Swanstrom  
Attorneys Feb. 22, 1927.
C. G. SWANSTROM
1,618,687
VALVE MECHANISM
Filed Sept. 25, 1925  3 Sheets-Sheet 3
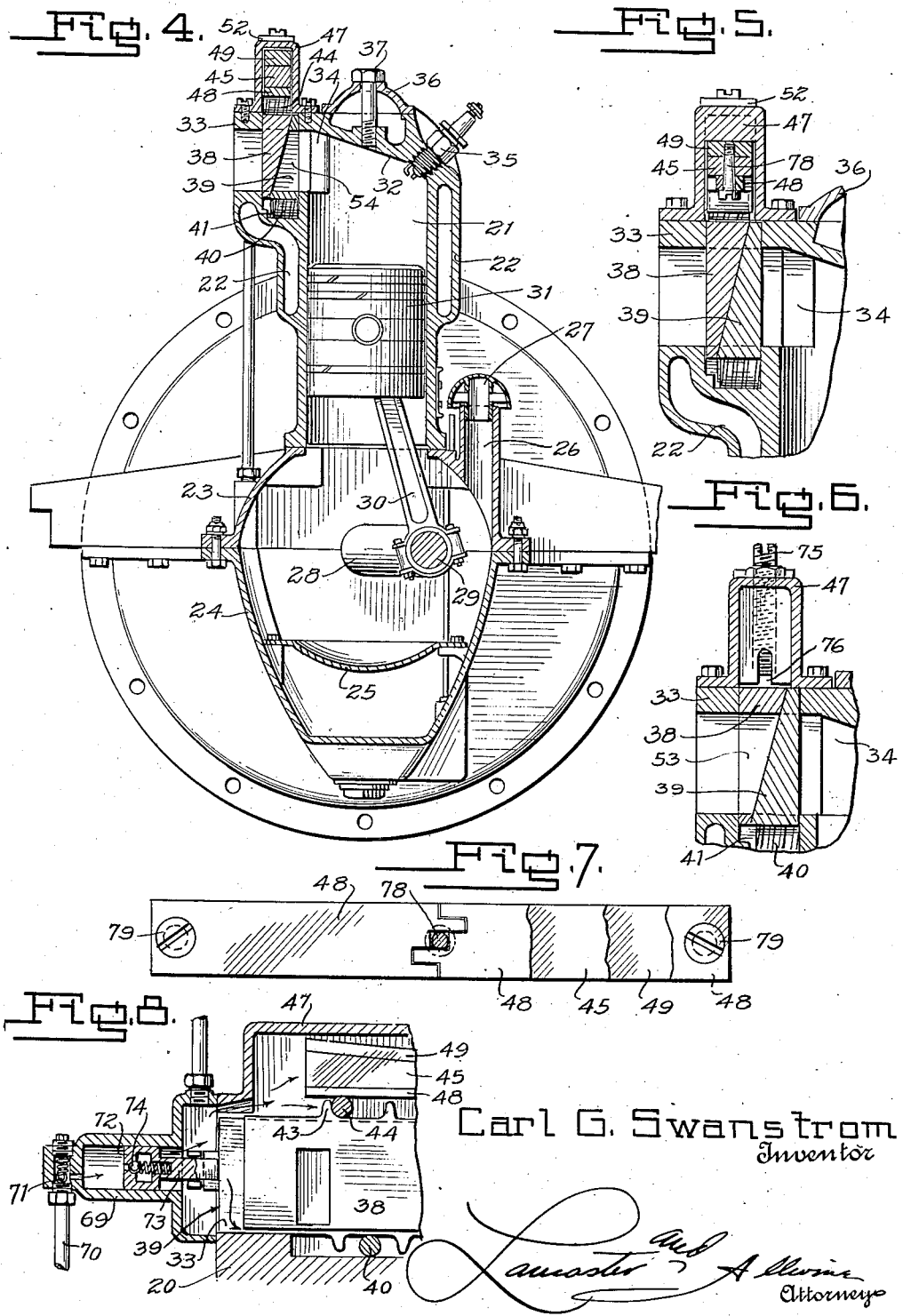
Carl G. Swanstrom
Inventor Patented Feb. 22, 1927.

1,618,687

UNITED STATES PATENT OFFICE.

CARL G. SWANSTROM, OF BUFFALO, MINNESOTA.

VALVE MECHANISM.

Application filed September 25, 1925. Serial No. 58,617.

The present invention relates to internal combustion engines, and particularly to those of the automotive type, and to certain improvements in the valve gear of the same.

At the present time there are in use two distinct types of valve gear for internal combustion engines. One type employs poppet valves which are more generally used for the admission of the gas mixture and for the exhausting of the burnt gases. These poppet valves when placed in the side of the cylinders, such as on L and T head engines provide gas pockets which prevent the complete scavenging of the cylinder on the exhaust stroke. The valve in the head engine does not have these pockets, but the poppet valves in this type are usually quite noisy and require frequent grinding and adjustment.

The second type of valve now used, but to a limited extent, is the sleeve valve which is considered relatively expensive in the construction of the valve and engine and for efficient work is therefore limited to a few high priced automobiles.

An object of the present invention is to provide a valve and valve gear eliminating the disadvantages and defects of both the poppet and sleeve valves, and which at the same time has peculiar advantages not found in prior valve gear structures.

Another object of the invention is to provide a valve gear for internal combustion engines so arranged and constructed that a single valve gear shaft may be employed for operating other parts of the engine aside from the valves, such as the fan, the distributor, the circuit breaker, the generator and the like, the entire assemblage being such as to present a compact and readily accessible structure.

A still further object of the invention is to provide, in conjunction with the valve gear, an improved lubricating means for supplying a lubricant positively to the valve gear and to regulate the flow of oil over the various contacting surfaces.

The invention still further aims at the provision of improved means associated with the valve gear for automatically maintaining a pair of slides in close but sliding contact under the widely varying temperatures to which the valve gear and adjacent parts are subjected during the different stages of operation of the engine.

The above and various other objects and advantages of the invention will in part be understood from, and in part be described in the following detailed description of the present preferred embodiment, the same being illustrated in the accompanying drawings, wherein:

Fig. 1 is a side elevation, partly in section, of an internal combustion engine having valve gear constructed according to the present invention applied thereto.

Fig. 2 is a horizontal section taken through the upper portion of the engine substantially on the line 2—2 of Fig. 1.

Fig. 3 is a fragmentary enlarged horizontal section taken through the top of the engine substantially on the line 3—3 of Fig. 1.

Fig. 4 is a transverse section taken through the engine substantially on the line 4—4 of Fig. 1.

Fig. 5 is a fragmentary vertical section taken through the valve guide with the valves and compensating means therein, substantially on the line 5—5 of Fig. 1.

Fig. 6 is a fragmentary enlarged vertical section through the valve guide and oil regulator taken substantially on the line 6—6 of Fig. 1.

Fig. 7 is a detail bottom plan view of one of the valve compensators, enlarged and partly broken away, and Fig. 8 is a fragmentary enlarged section taken through the rear end of the valve guide and adjacent parts, showing the oil pump and its connection to the valve guide.

Referring to the drawings 20 designates a cylinder block of usual form, and shown in the present instance as having four cylinders 21 provided with a water jacket 22 and seated upon the upper portion 23 of the crank case, the latter having a lower section 24 in which the oil pan 25 is mounted. The crank case has a breather pipe 26 at one side of the upper section 23 closed by a removable cap 27 in the usual manner. Mounted in the crank case is a crank shaft 28 having a crank 29 for each cylinder connected to the lower end of a connecting rod 30 which extends upwardly into its respective cylinder 21 and connected at its upper end to a piston 31 in the cylinder 21.

The upper end or head of the cylinder 21 has an inclined wall 32 which slopes upwardly toward one side of the cylinder 21 and leads to a valve guide 33 which extends lengthwise of the block 20 and communicates with the respective cylinders 21 through ports 34 provided in the sides of the cylinders 21 immediately beneath the heads 32. Each cylinder 21 is provided with a spark plug 35 screwed through the lower portion of the head 32 and extending directly into the top or combustion chamber of the cylinder 21. A cap plate 36, secured by bolts 37 or the like is placed over the head 32 and forms therewith a water jacket for the head of the block.

The valve guide 33 is provided with a rectangular passage therein extending the entire length of the valve guide and arranged to house a pair of relatively slidable valve plates 38 and 39 which are also adapted for longitudinal shifting in the valve guide 33. The valve plates 38 and 39 are substantially triangular in cross section and have their inner meeting faces bevelled or inclined from edge to edge and are placed in the valve guide 33 in an edgewise vertical position. As shown, the inner valve plate 39 is provided with its wider or base edge at the bottom of the guide 33 and seated upon rollers 40, one preferably opposite each cylinder 21. The rollers 40 are disposed in a longitudinal groove or recess 41 formed in the guide 33 at its bottom, and the upper portion of the groove 41 is laterally enlarged for freely receiving the adjacent lower ends of the valve plates 38 and 39.

In order to maintain the rollers 40 in properly spaced relation to support the inner guide plate 39, the latter is provided, opposite each cylinder, 21, with spaced stop lugs 42 adapted to confine the adjacent roller 40 in position and at the same time permit of the free movement of the roller when the valve plate 39 is shifted.

The outer valve plate 38 has its base or wider edge in the top of the valve guide 33 and is provided, in register with the lugs 42, with spaced stop lugs 43 between each pair of which is mounted a roller 44. Four rollers 44 are provided in the structure shown, and each pair of rollers at opposite ends of the engine is provided with a compensating block 45 having a relatively horizontal lower face adapted to rest upon the rollers 44 and which have inclined upper faces which extend downwardly toward each other and which slidably engage depending abutments 46 carried upon the inner side of a housing 47 which is secured over and along the top of the valve guide 33.

Each compensating block 45 comprises a wedge shaped copper body portion provided on its lower side with a steel strip or shoe 48, and on its upper side with a second steel strip or shoe 49 to take up wear. The upper shoes 49 each have, near their lower adjacent ends, an upstanding apertured lug 50, and a contracting spring 51 is mounted in the housing 47 between the compensating blocks 45 and connected at opposite ends to the lugs 50 for normally urging the blocks to slide toward each other. A removable plate 52 is preferably placed on the intermediate portion of the housing 47 to admit of convenient access to the spring 51 and adjacent parts for convenience in assembly, adjustment and repair.

The valve plates 38 and 39 are provided with slots or passages 53 and 54 therethrough adapted to be brought into register with each other and also with the ports 34 in the sides of the cylinders 21 to effect the intake and exhaust of the explosive mixture and the burnt gases in properly timed relation. The exterior wall of the valve guide 33 is provided with continuations of the ports 34 so that the exhaust and intake manifolds, either singly or combined, may be attached to the side of the engine block in the usual manner.

The valve plates 38 and 39 are operated by a valve shaft 55 which is mounted vertically at the forward end of the engine and encased in a housing 56 in the form of a plate secured to the forward end of the engine. The plate 56 forms the front wall of the housing and the latter is completed by a rear wall 57. The housing, generally indicated at 56, establishes communication between the valve guide 33 and the forward end of the crank case 23. The shaft 55 is provided, in longitudinal alignment with the valve guide 33, with a pair of crank portions 58 and 59 which are respectively connected to the valve plates 39 and 38 by connecting rods 60 and 61. The forward ends of the plates 38 and 39 have forked arms 62 and 63 which project from the respective upper and lower edge portions of the valve plates in line with the connecting rods 61 and 60, and which are preferably offset into overlapping relation and into longitudinal alignment with the valve shaft 55.

The valve shaft 55 may be extended upwardly through the housing 47 for connection to other movable parts of the motor, not shown, and may be used for driving the distributor or the like. The shaft 55 is also provided with a gear wheel 64 arranged in proximity to the fan 65 of the engine and meshing with a second gear wheel 66 mounted on the fan shaft 67 for positively driving the same and eliminating the use of the usual drive belt.

The valve shaft 55 is driven by a gear wheel 68 mounted on the lower end of the shaft for connection with the crank shaft 28 for driving the shaft 55 therefrom, the speed of the valve shaft 55 being one half that of the crank shaft for operating the valves.

In order to lubricate the valve plates 38 and 39, and the other operating parts of the valve gear, a pump casing 69 is secured against the rear end of the valve guide 33 and connected at its outer end by a pipe 70 to the crank case 23. A check valve 71 is fitted in the outer end of the pump case 69 at the top of the pipe 70 to prevent the backward or downward flow of oil into the crank case. A plunger 72 is mounted in the casing 69 and is connected by a stem 73 with the rear end of one of the slide plates, such as the inner plate 39 as shown in Fig. 2. The plunger 72 is provided with a check valve 74 which opens inwardly toward the valve guide 33. As the valve plate 39 reciprocates the plunger 72 draws oil upwardly through the pipe 70 and through the pump casing 69 into the valve guide.

As shown in Fig. 8, the rear end of the valve guide 33 and the casing 47 are provided with clearances opening into the plunger casing 69, and the latter is enlarged, for directing the incoming oil into the housing 47 and also beneath the valve plates 38 and 39 to lubricate all contacting surfaces in both the valve guide 33 and its housing 47. The oil is fed forwardly through the casing 47 and over the valve plates 38 and 39, and also through the lower groove or recess 41 in the bottom of the valve guide 33, and the oil is thus brought into contact with the connecting rods 60 and 61 and their bearings and the shaft 55.

The oil is now permitted to pass downwardly through the valve shaft casing 56 back into the crank case 23.

The passage of the oil through the forward end of the housing 47 is regulated by a screw valve 75 which is threaded downwardly through the top of the casing 47 and which projects into an opening 76 formed in the lower end of a baffle plate 77 projecting downwardly from the top of the housing 47 near its forward end. By raising the screw 75 the flow of the oil is increased through the top of the casing 47 and consequently the correct amount of oil may be retained about the valve plates 38 and 39 and their compensating blocks 45.

In operation, as the crank shaft rotates the valve shaft 55 and, through the connecting rods 60 and 61 the valve plates 38 and 39 are reciprocated back and forth in the valve guide 33 and against each other. It will be noted that the forks in the arms 62 and 63 are relatively wide to permit of the vertical shifting of the valve plates 38 and 39 against each other without binding on the connecting rods 60 and 61, such shifting occurring gradually and to a very slight degree incident to wear and also to temperature changes which effect the expansion and contraction of the parts.

The compensating blocks 45 are adapted to at all times maintain the rollers 44 in contact with the outer valve plate 38 and the spring 51 is utilized in sliding the wedge shaped blocks 45 to maintain a constant pressure between the valve plates. The lower shoes 48 of the slide blocks are preferably made in sections which meet intermediately of the blocks and which are coupled together by a retaining screw 78 which has a head on its lower end engaging the meeting ends of the adjacent shoe sections and which extends upwardly and has threaded engagement only with the top strip or shoe 49. The ends of the block sections are rigidly connected together by screws 79 which have their heads countersunk in the lower shoes 48 of the blocks and which have threaded engagement only with the upper strip or shoe 49. This construction permits the intermediate copper body portion to expand when subjected to heat so that the compensating blocks sag at their intermediate portions as the heat increases and consequently the pressure of the opposite ends of the blocks on the rollers 44 is decreased and permits of the expansion of the valve plates 38 and 39 without binding against each other and in the valve guide 33.

This copper and steel combination in the compensating block 45 is required as the angle of the block must be sufficiently sharp so that the pressure incident to the explosions in the motor against the valve plates 38 and 39 will not cause the blocks 45 to work against the spring 51.

It is of course understood that various changes and modifications may be made in the details of construction and design of the above specifically described embodiment of the valve gear without departing from the spirit of the invention, and being restricted only by the scope of the following claims.

What is claimed is:

1. In valve gear for internal combustion engines, a valve guide mounted upon one side of the engine and communicating with the cylinders thereof, a pair of contacting plates mounted for longitudinal sliding movement in the guide and against each other, said plates having openings therein adapted to register with each other and with said cylinders, the contacting surfaces of said plates being transversely inclined, means for supporting the lower edge of one of said plates, thermostatic means engaging the upper edge of the other plate to normally urge the latter downwardly and into contact with the first plate and maintain an even pressure between the plates during temperature changes, a valve shaft connected to the engine and having crank portions opposite the plates, and connecting rods between said crank portions and the plates for longitudinally sliding the same.

2. In valve gear for internal combustion engines, a valve guide mounted along one side of the engine, a pair of slide plates mounted in said guide and having openings communicating with each other and with the cylinders of the engine, operating means between the engine and the slide plates for operating the latter, rollers in the bottom of the guide for supporting one of said plates at its lower edge, said plates having transversely inclined contacting surfaces, rollers mounted on the upper edge of the other plate, a wedge shaped thermostatic block bearing at opposite ends upon said rollers, an abutment in the top of the guide engaging said block to normally urge the same downwardly and maintain said plates in surface contact with each other, said block being adapted to warp downwardly between its ends when subjected to heat to relieve pressure of the block on the rollers and permit expansion of said slide plates, and means for regulating the position of the blocks to compensate for wear between the plates.

3. In valve gear for internal combustion engines, a guide arranged along the side of the engine, a pair of wedge shaped plates mounted in surface contact in the guide and having openings therethrough for registry with each other and with the cylinders of the engine, means for longitudinally sliding said plates, and thermostatic means for moving said plates relatively in an edgewise direction to maintain proper contact therebetween during temperature changes.

4. In combination with an internal combustion engine, a valve guide arranged along one side of the engine, slide valves mounted in the guide for communication with the cylinders of the engine, means between the engine and the slide valves for operating the latter, tension means carried in the guide for engaging the plates to maintain the same in surface contact during temperature changes, oil circulating means mounted upon one end of the guide and connected to one of said plates for operation thereby to feed oil into said end of the guide, communicating means between the other end of the valve guide and the engine for returning oil thereto, and adjustable means for controlling the passage of oil through said guide.

5. In combination with an internal combustion engine, a valve guide at one side of the engine, a pair of sliding valve plates in the guide having openings therethrough leading to the cylinders of the engine, operating means between the engine and the plates for reciprocating the same, an oil pump connected to one end of the valve guide and having a plunger connected to one of said sliding plates for operating the oil pump when the plates are reciprocated, a connection between the pump and the crank case of the engine to withdraw oil therefrom, a connection between the opposite end of the valve guide and the crank case for returning oil to the latter, a baffle mounted in the guide, and a screw valve threaded through the guide and into the baffle for regulating the passage of oil therethrough.

6. In valve gear for internal combustion engines, guide means arranged along one side of the engine, a plurality of valve plates mounted in said guide means and having inclined abutting faces, means for longitudinally moving said plates, tension means for maintaining proper contact between the plates during temperature changes, and lubricating means adapted to lubricate the plates.

7. In valve gear for internal combustion engines, guide means arranged along the side of the engine, valve plates mounted in the guide and adapted for longitudinal movement therein, operating means for longitudinally moving said plates, thermostatic means for moving said plates relatively in an edgewise direction to maintain proper contact therebetween during temperature changes, and means for lubricating the plates.

CARL G. SWANSTROM.